(12) United States Patent
Ting et al.

(10) Patent No.: US 11,964,687 B2
(45) Date of Patent: Apr. 23, 2024

(54) BATTERY POWERED WORKSTATION CART FOR ORDER FULFILLMENT

(71) Applicant: Green Cubes Technology, LLC, Kokomo, IN (US)

(72) Inventors: Calvin Ting, Kokomo, IN (US); Mohammed Alobaidi, Kokomo, IN (US); Goo Sung, Kokomo, IN (US)

(73) Assignee: Green Cubes Technology, LLC, Kokomo, IN (US)

( * ) Notice: Subject to any disclaimer, the term of this patent is extended or adjusted under 35 U.S.C. 154(b) by 0 days.

(21) Appl. No.: 18/107,183

(22) Filed: Feb. 8, 2023

(65) Prior Publication Data

US 2023/0182797 A1    Jun. 15, 2023

Related U.S. Application Data

(63) Continuation of application No. 17/045,594, filed as application No. PCT/US2019/026350 on Apr. 8, 2019, now Pat. No. 11,577,769.

(Continued)

(51) Int. Cl.
*B62B 3/14* (2006.01)
*B62B 5/00* (2006.01)
*H01M 10/0525* (2010.01)

(52) U.S. Cl.
CPC .......... *B62B 3/1472* (2013.01); *B62B 3/1424* (2013.01); *B62B 3/1464* (2013.01);
(Continued)

(58) Field of Classification Search
CPC ... B62B 3/1472; B62B 3/1424; B62B 3/1464; B62B 5/0096; B62B 2202/56;
(Continued)

(56) References Cited

U.S. PATENT DOCUMENTS 1,445,395 A * 2/1923 Harvey .................... A47B 3/12
211/195
3,429,403 A * 2/1969 Zandell ................. B62B 3/1464
414/536

(Continued)

FOREIGN PATENT DOCUMENTS

CA    2820476 A1    9/2013
CN    103569573 A    2/2014
(Continued)

OTHER PUBLICATIONS

Translated FR-3013022-A1 (Year: 2023).*
(Continued)

*Primary Examiner* — James A Shriver, II
*Assistant Examiner* — Ian Bryce Shelton
(74) *Attorney, Agent, or Firm* — Reichel Stohry Dean LLP; Mark C. Reichel; Natalie J. Dean

(57) ABSTRACT

Mobile battery powered workstation carts for order fulfillment are disclosed herein. In one embodiment, a battery powered workstation cart may comprise a wheeled cart having a frame, a rechargeable lithium battery, a computer, a barcode reader/scanner, a RFID reader/scanner, a printer, an artificial intelligence hub, Wi-Fi, Bluetooth Low Energy (BLE), and/or GPS. The frame may also comprise two side bracket arms and/or shelves, which may be modular to receive various different sized baskets, bins, or totes therein to expedite retail order fulfillment.

19 Claims, 8 Drawing Sheets

Related U.S. Application Data

(60) Provisional application No. 62/653,792, filed on Apr. 6, 2018.

(52) U.S. Cl.
CPC ....... *B62B 5/0096* (2013.01); *H01M 10/0525* (2013.01); *B62B 2202/56* (2013.01)

(58) Field of Classification Search
CPC . B62B 2202/26; B62B 3/106; B62B 2202/12; H01M 10/0525
See application file for complete search history.

(56) References Cited

U.S. PATENT DOCUMENTS

| | | | |
|---|---|---|---|
| 4,071,740 A | 1/1978 | Gogulski | |
| 5,250,789 A * | 10/1993 | Johnsen | B62B 3/1424 705/14.4 |
| 5,435,582 A * | 7/1995 | Davidson | B62B 3/1468 280/47.35 |
| 6,820,062 B1 | 11/2004 | Gupta et al. | |
| 7,168,715 B1 * | 1/2007 | Friedman | B62B 3/005 280/33.996 |
| 8,567,798 B2 | 10/2013 | Rossini et al. | |
| 8,905,411 B1 * | 12/2014 | Blanton | B62B 3/1464 280/47.35 |
| 9,050,988 B1 * | 6/2015 | McLeod | B62B 3/027 |
| 9,230,249 B1 | 1/2016 | Vora | |
| 9,705,359 B2 | 7/2017 | Boyd | |
| 10,915,936 B1 | 2/2021 | Vora | |
| 2001/0029405 A1 | 10/2001 | Lipps | |
| 2003/0155731 A1 * | 8/2003 | Ditges | B65G 1/1375 280/47.35 |
| 2004/0165348 A1 | 8/2004 | Clark et al. | |
| 2004/0217584 A1 | 11/2004 | Ditges et al. | |
| 2005/0035198 A1 * | 2/2005 | Wilensky | B62B 3/1424 235/383 |
| 2006/0006229 A1 | 1/2006 | Strom | |
| 2007/0096437 A1 * | 5/2007 | Watson | B62B 3/106 280/651 |
| 2009/0058024 A1 * | 3/2009 | Cagan | B62B 3/1468 280/33.991 |
| 2009/0283989 A1 * | 11/2009 | Abecassis | B62B 3/027 280/47.35 |
| 2009/0309323 A1 * | 12/2009 | Oliver | B25H 3/00 280/47.17 |
| 2010/0057245 A1 * | 3/2010 | Hironaka | G06Q 10/08 700/214 |
| 2011/0115177 A1 * | 5/2011 | de Sousa | B62B 3/1468 280/47.38 |
| 2011/0127736 A1 * | 6/2011 | Oliver | B62B 1/14 280/47.17 |
| 2012/0296751 A1 | 11/2012 | Napper | |
| 2016/0176637 A1 | 6/2016 | Ackerman et al. | |
| 2017/0129518 A1 * | 5/2017 | Huisman | B62B 1/125 |
| 2017/0258189 A1 * | 9/2017 | Goldfinger | A45C 3/045 |
| 2018/0050714 A1 | 2/2018 | Green et al. | |
| 2018/0057033 A1 * | 3/2018 | Green | G06Q 10/087 |
| 2018/0089474 A1 | 3/2018 | Ramon et al. | |
| 2019/0023297 A1 | 1/2019 | Torrison | |
| 2019/0217878 A1 * | 7/2019 | Duru | B62B 3/022 |
| 2019/0270469 A1 | 9/2019 | Yokoyama et al. | |
| 2021/0117950 A1 | 4/2021 | Bentsur et al. | |

FOREIGN PATENT DOCUMENTS

| | | | |
|---|---|---|---|
| DE | 29600872 U1 | 4/1996 | |
| DE | 10158171 C1 * | 7/2003 | ........... B62B 3/1464 |
| DE | 10158171 C1 | 7/2003 | |
| EP | 2390160 A2 * | 11/2011 | ............ B62B 3/106 |
| FR | 2569151 A1 | 2/1986 | |
| FR | 2983158 A1 | 5/2013 | |
| FR | 2983158 A1 * | 5/2013 | ........... A45C 13/001 |
| FR | 3013022 A1 * | 5/2015 | ............ B62B 3/027 |
| FR | 3013022 A1 | 5/2015 | |
| JP | H03 70674 A | 3/1991 | |
| JP | 2007323453 A | 12/2007 | |
| WO | 0034102 A1 | 6/2000 | |
| WO | WO-0034102 A1 * | 6/2000 | ............ B62B 3/144 |
| WO | WO-0074996 A1 * | 12/2000 | ............ B62B 3/022 |
| WO | 2005102812 A1 | 11/2005 | |
| WO | WO-2005102812 A1 * | 11/2005 | ............ B62B 3/144 |
| WO | 2007104071 A1 | 9/2007 | |
| WO | WO-2007104071 A1 * | 9/2007 | ............ B62B 3/027 |
| WO | 2011161390 A1 | 12/2011 | |
| WO | WO-2011161390 A1 * | 12/2011 | ............... A45C 3/04 |
| WO | 2012004529 A1 | 1/2012 | |
| WO | WO-2012004527 A1 * | 1/2012 | ............ A45C 13/26 |
| WO | WO-2012004528 A1 * | 1/2012 | ............ A45C 13/26 |
| WO | WO-2012004529 A1 * | 1/2012 | ............ B62B 3/106 |
| WO | WO-2012072912 A1 * | 6/2012 | ............ B62B 3/106 |
| WO | 2013093384 A1 | 6/2013 | |
| WO | 2014023937 A1 | 2/2014 | |
| WO | WO-2018115903 A1 * | 6/2018 | ............ B62B 3/027 |

OTHER PUBLICATIONS

Patent Cooperation Treaty (PCT), International Searching Authority, International Search Report, PCT/US2019/026350, dated Jun. 28, 2019.

Patent Cooperation Treaty (PCT), International Searching Authority, Written Opinion of the International Searching Authority, PCT/US2019/026350, dated Jun. 28, 2019.

* cited by examiner

BATTERY POWERED WORKSTATION CART FOR ORDER FULFILLMENT

PRIORITY

The present application is related to, claims the priority benefit of, and is a U.S. continuation patent application of, U.S. patent application Ser. No. 17/045,594, filed Oct. 6, 2020, which issued on Feb. 14, 2023 as U.S. Pat. No. 11,577,769, which is the U.S. National Stage patent application of the Patent Cooperation Treaty application Serial No. PCT/US2019/026350 filed Apr. 8, 2019, and is related to, and claims the priority benefit of, U.S. Provisional Patent Application Ser. No. 62/653,792, filed Apr. 6, 2018, the contents of the preceding which are incorporated herein directly and by reference in their entirety.

BACKGROUND

With online ordering becoming more popular, more stores are offering in-store pickup and/or local delivery from store. Consumers place their orders online and the store employees then need to fulfill the orders in the store. The store employees currently fill online orders by going through the store or warehouse and gathering the ordered items with a shopping cart or flatbed type of cart before returning to the preparation area. They will also sometimes print labels and then label the items picked. When returning to the preparation area, they must then box or bag the gathered items for the customer. The employees must then print invoices, paperwork, and/or delivery or shipping labels to be added to the order and then complete the order on their computer system before the order is considered to be fulfilled. Currently, the employees often pull the items for the order and put them into a cart, then take the cart to a storage area and load the items onto a rack. When the customer then arrives to pick up the order (or its time to deliver the order), the employees must return to the storage area to reload the items, bring them to the front and then bag the items. This current process introduces redundancies that are an inefficient use of employee time.

Store employees must work in a timely and efficient manner to scan, stock, and organize their inventory, shelves, and stores. They carry portable barcode readers and/or label printers. Scanning out of stock items, returning to the backroom, pulling the items, putting the items out on display, and then scanning those items is very time consuming, while potentially disruptive to the customer experience.

Having a mobile battery powered workstation cart with the computer, printer, labels, bags, bins, baskets, totes, etc. in the form of a shopping cart or flatbed type of cart would be very desirable to increase order fulfillment efficiency. Having the bags, bins, totes, or baskets located on the powered workstation cart will aid in end-to-end order fulfillment (the bags will be used to gather the ordered items and/or then can be given to the customer) and will help eliminate the redundant packing and unpacking process by store employees. Currently, powered workstation carts used by stores are very bulky, difficult to maneuver, and don't contain a modular area for bags, totes, or baskets. An example of a current workstation cart is shown in FIG. 5 for purposes of comparison.

Since the order fulfillment tasks are often completed during store hours and in front of customers, having the workstation in a standard shopping cart shape or a flatbed cart shape would be more familiar and customer friendly. Because customers are familiar with the shape and presence of shopping carts, they will be more comfortable seeing a shopping cart being used for order fulfillment. Additionally, store employees would be comfortable maneuvering the workstation in a shopping cart form, thus reducing liability from accidents. Having a workstation powered by a lithium battery will provide power to the computer, printer, barcode readers/scanners, and other electronic accessories that will aid in the completion of the order fulfillment tasks on the workstation cart.

BRIEF SUMMARY

The present disclosure includes disclosure of a mobile battery powered workstation cart for order fulfillment, comprising a wheeled cart having a frame, the frame comprising a lower wheeled base portion, an upper portion having a handle positioned at a comfortable standing height, and configured to securely receive a plurality of electronic components thereon, and an intermediate portion between the lower wheeled base portion and the upper portion and having two arms spaced apart and configured to releasably receive at least one bin therein; a rechargeable battery positioned within a battery housing, wherein the battery housing is securely attached to the frame; a computer securely mounted to the upper portion of the frame and operably coupled to the rechargeable battery; a barcode reader/scanner removably mounted to the upper portion of the frame and operably coupled to the rechargeable battery; and at least one communications component coupled to the frame and operably coupled to the rechargeable battery. The present disclosure includes disclosure of a mobile battery powered workstation cart for order fulfillment, wherein the at least one communications component operates using at least one technology selected from the group consisting of a Wi-Fi technology, Bluetooth Low Energy (BLE) technology, and Global Positioning System (GPS) technology.

The present disclosure includes disclosure of a mobile battery powered workstation cart for order fulfillment, wherein the communications component is located within the computer.

The present disclosure includes disclosure of a mobile battery powered workstation cart for order fulfillment, wherein the at least one communications component operates using at least one technology selected from the group consisting of a Wi-Fi technology, Bluetooth Low Energy (BLE) technology, and Global Positioning System (GPS) technology.

The present disclosure includes disclosure of a mobile battery powered workstation cart for order fulfillment, wherein the communications component is located outside of the computer. The present disclosure includes disclosure of a mobile battery powered workstation cart for order fulfillment, wherein the rechargeable battery is a rechargeable lithium-ion battery.

The present disclosure includes disclosure of a mobile battery powered workstation cart for order fulfillment, wherein the two arms are configured to be substantially or absolutely parallel to a floor. The present disclosure includes disclosure of a mobile battery powered workstation cart for order fulfillment, wherein the two arms are configured to slidingly receive the at least one bin therein. The present disclosure includes disclosure of a mobile battery powered workstation cart for order fulfillment, wherein the at least one bin may be removed from between the two arms by lifting or sliding. The present disclosure includes disclosure of a mobile battery powered workstation cart for order fulfillment, wherein the rechargeable battery is removable from the battery housing for recharging. The present disclosure includes disclosure of a mobile battery powered workstation cart for order fulfillment, wherein the rechargeable battery further comprises a cord for plugging into a wall outlet for recharging.

The present disclosure includes disclosure of a mobile battery powered workstation cart for order fulfillment, wherein the rechargeable battery is configured to engage a cord for plugging into a wall outlet for recharging. The present disclosure includes disclosure of a mobile battery powered workstation cart for order fulfillment, wherein the computer further comprises a display configured to information selected from the group consisting of real time order fulfillment information, location information of particular items, and other order fulfillment status information. The present disclosure includes disclosure of a mobile battery powered workstation cart for order fulfillment, further comprising a printer securely mounted to the frame and operably coupled to the rechargeable battery. The present disclosure includes disclosure of a mobile battery powered workstation cart for order fulfillment, further comprising an artificial intelligence hub securely mounted to frame and operably coupled to the rechargeable battery.

The present disclosure includes disclosure of a mobile battery powered workstation cart for order fulfillment, wherein the two arms are configured to be adjustable by sliding vertically along the frame. The present disclosure includes disclosure of a mobile battery powered workstation cart for order fulfillment, further comprising a second set of spaced apart arms configured to releasably receive at least one second basket therein. The present disclosure includes disclosure of a mobile battery powered workstation cart for order fulfillment, wherein the at least one bin comprises a compartment selected from the group consisting of at least one basket, at least one tote, at least one crate, at least one bag, and at least two compartments comprising one or more baskets, totes, crates, and bags. The present disclosure includes disclosure of a mobile battery powered workstation cart for order fulfillment, wherein the at least one bin is removed from the frame to result in a flatbed cart configuration.

The present disclosure includes disclosure of a mobile battery powered workstation cart for order fulfillment, further comprising at least one of a radio frequency identification (RFID) reader/scanner and/or a barcode reader/scanner removably mounted to the upper portion of the frame and operably coupled to the rechargeable battery.

The present disclosure includes disclosure of a mobile battery powered workstation cart for order fulfillment, comprising a wheeled cart having a frame, the frame comprising a lower wheeled base portion, a middle portion having at least one shelf configured to receive at least one bin therein, wherein the shelf comprises higher side brackets and a lower front edge to slidingly receive the at least one bin via the lower front edge of the shelf, and an upper portion having a handle positioned at a comfortable standing height, and configured to securely receive a plurality of electronic components thereon; a rechargeable lithium battery positioned within a battery housing, wherein the battery housing is securely attached to the frame; a computer securely mounted to the upper portion of the frame and operably coupled to the rechargeable lithium battery; a RFID reader/scanner removably mounted to the upper portion of the frame and operably coupled to the rechargeable lithium battery; and a printer securely mounted to the frame and operably coupled to the rechargeable lithium battery. The present disclosure includes disclosure of a mobile battery powered workstation cart for order fulfillment, further comprising an anti-theft tag. The present disclosure includes disclosure of a mobile battery powered workstation cart for order fulfillment, further comprising at least one communications component operating using at least one technology selected from the group consisting of a Wi-Fi technology, Bluetooth Low Energy (BLE) technology, and GPS technology.

The present disclosure includes disclosure of a mobile battery powered workstation cart for order fulfillment, mobile battery powered workstation cart for order fulfillment, comprising:
a wheeled cart having a frame, the frame comprising a lower wheeled base portion, a middle portion having at least one shelf configured to receive at least one bin therein, wherein the shelf comprises higher end brackets at both a front portion and a back portion of the cart, and wherein the shelf comprises a lower side edge to slidingly receive the at least one bin via the lower side edge of the shelf, and an upper portion having a handle positioned at a comfortable standing height, and configured to securely receive a plurality of electronic components thereon; a rechargeable lithium battery positioned within a battery housing, wherein the battery housing is securely attached to the frame; and a computer securely mounted to the upper portion of the frame and operably coupled to the rechargeable lithium battery. The present disclosure includes disclosure of a mobile battery powered workstation cart for order fulfillment, further comprising at least one of a radio frequency identification (RFID) reader/scanner and/or a barcode reader/scanner removably mounted to the upper portion of the frame and operably coupled to the rechargeable lithium battery. The present disclosure includes disclosure of a mobile battery powered workstation cart for order fulfillment, further comprising a printer securely mounted to the frame and operably coupled to the rechargeable lithium battery.

The present disclosure includes disclosure of a mobile battery powered workstation cart for order fulfillment, comprising a wheeled cart having a frame, the frame comprising a lower wheeled base portion, an upper portion having a handle positioned at a comfortable standing height, and configured to securely receive a plurality of electronic components thereon, and an intermediate portion between the lower wheeled base portion and the upper portion and having two arms spaced apart and configured to releasably receive at least one bin therein; a rechargeable battery positioned within a battery housing, wherein the battery housing is securely attached to the frame; a computer securely mounted to the upper portion of the frame and operably coupled to the rechargeable battery; a barcode reader/scanner removably mounted to the upper portion of the frame and operably coupled to the rechargeable battery; and at least one communications component coupled to the frame and coupled to the rechargeable battery.

A mobile battery powered workstation cart for order fulfillment, comprising a wheeled cart having a frame, the frame comprising a lower wheeled base portion, a middle portion having two arms spaced apart and configured to releasably receive at least one bin therein, and an upper portion having a handle positioned at a comfortable standing height, and configured to securely receive a plurality of electronic components thereon; a rechargeable lithium battery positioned within a battery housing, wherein the battery housing is securely attached to the frame; a computer positioned at the upper portion of the frame and operably coupled to the rechargeable battery; a barcode reader/scanner removably mounted to the upper portion of the frame and operably coupled to the rechargeable lithium battery;

and at least one of Wi-Fi, Bluetooth Low Energy (BLE), or GPS securely coupled to the frame and operably coupled to the rechargeable lithium battery.

A mobile battery powered workstation cart for order fulfillment, comprising a wheeled cart having a frame, the frame comprising a lower wheeled base portion, an upper portion configured to securely receive a plurality of electronic components thereon, and an intermediate portion between the lower wheeled base portion and the upper portion and having two arms spaced apart and configured to releasably receive at least one bin therein; a rechargeable battery configured for secure attachment to the frame; a computer securely mounted to the upper portion of the frame and configured to receive power from the rechargeable lithium battery and/or an internal battery within the computer; a barcode reader/scanner removably mounted to the upper portion of the frame and operably coupled to the rechargeable battery; and at least one communications component coupled to the frame and operably coupled to the rechargeable battery.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
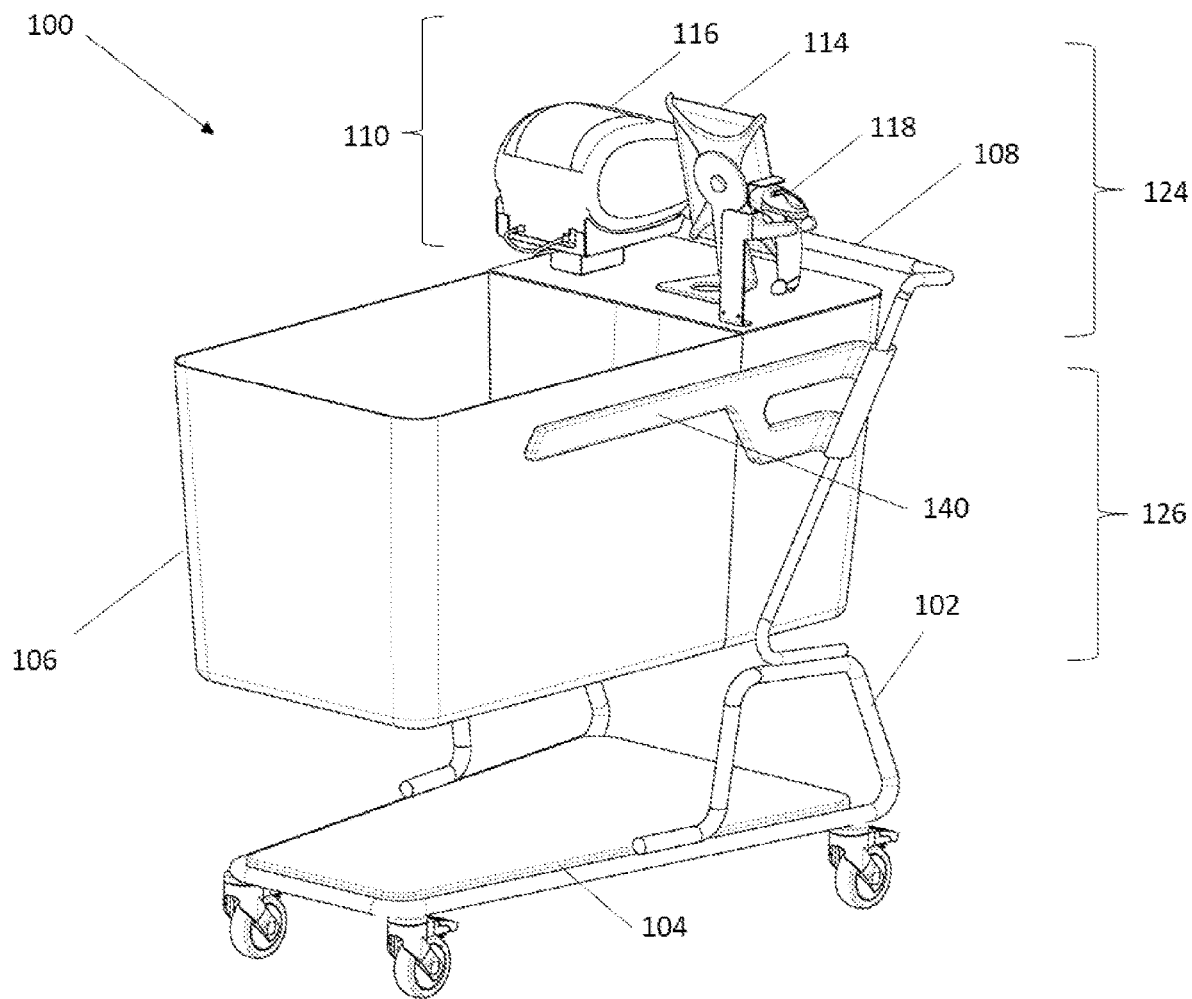
FIG. 1 illustrates a perspective view of an exemplary embodiment of a battery powered workstation cart, having a large basket therein.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes various battery powered workstation carts for order fulfillment, systems, and methods for operating a mobile battery powered workstation cart to fulfill an order. The lithium battery powered workstation cart may include a computer, printer, barcode reader/scanner, RFID reader/scanner, artificial intelligence hub, and other electronic devices necessary for completion of order fulfillment tasks by employees. These battery powered mobile workstation carts can be utilized to improve order fulfillment efficiency in stores, as well as in various other operations and industries. These battery powered workstation carts are intended to efficiently aid retail employees in identifying, labeling, cataloging, picking, and packing goods to address order fulfillment in modern, larger retail stores. These battery powered workstation carts are battery powered to support the electronic components, such as the mobile computer, barcode-reading, RFID-reading, artificial intelligence hub, and printing devices needed to support order fulfillment. Further, these battery powered workstation carts are intended to be modular, so that the bagging area can be reconfigured for larger or smaller orders, having different numbers of bags, bins, totes, crates, or baskets thereon.

Figure 2:
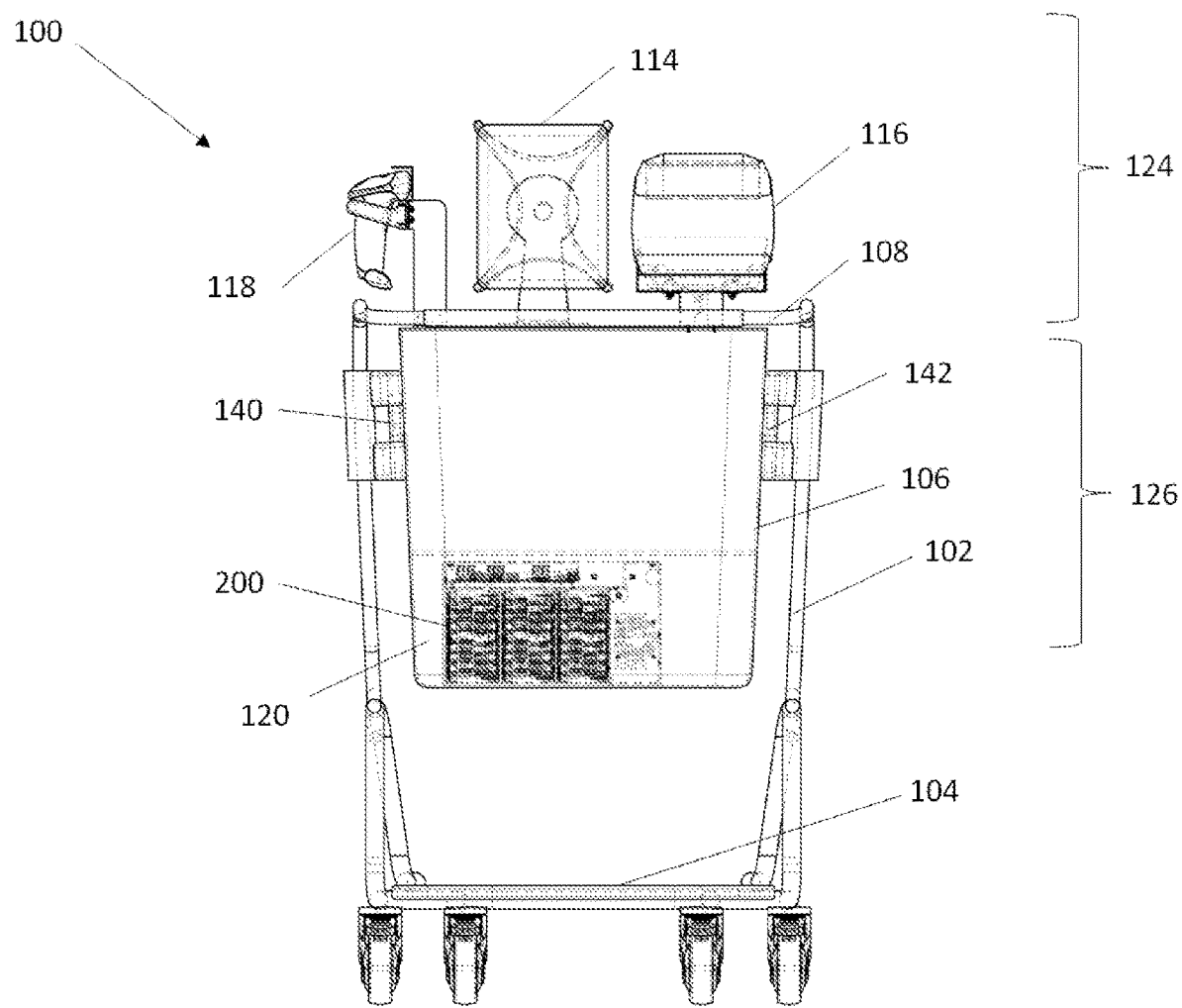
FIG. 2 illustrates an end view of an exemplary embodiment of a battery powered workstation cart, having multiple electronic components.

As shown in FIGS. 1 and 2, the battery powered mobile workstation cart 100 may have the generally familiar shape of a cart 100, having four wheels attached to a sturdy metal frame 102 (providing structural integrity to cart 100). The frame may include: 1) a lower wheeled base portion 104, which may itself be a shelf 104 (also referred to as a lower storage platform, which can be solid, a mesh, etc., depending on desired use, such as to support larger flat-pack items), 2) a middle or intermediate portion (shown generally as 126) having two arms 140 and 142 spaced apart and configured to releasably receive at least one bin or basket 106 etc. therein; and 3) an upper portion (shown generally as 124) having a handle or handlebar extension 108 (often part of frame 102) positioned at a comfortable standing height (such as a height of at or between 24" and 60", for example), and configured to securely receive a plurality of electronic components (generally referred to as 110) herein.

This battery powered workstation cart 100 may operate as a mobile base workstation, for holding and powering electronic components 110, such as a computer 114 (such as a laptop computer or a tablet computer, with holder, for example), printer 116 (such as a label printer with holder, for example), artificial intelligence hub 130 (but may be part of computer 114, or electronic components 110), barcode scanner/reader 118, and radio frequency identification (RFID) scanner/reader needed for in-store order fulfillment. Computer 114, printer 116, and barcode scanner/reader 118 are shown herein as exemplary electronic components 110 for purposes of illustration, but some embodiments may comprise additional, or fewer, electronic components 110 as being within the scope of the present invention. For example, computer 114 represents various types of computing devices and/or processors (e.g. laptop PCs, tablets, and phones), while printer 116 represents multiple standard printers and/or label printers, and each can include components and accessories to power the same. Printer 116 and printer holder 116 (implying an apparatus for retaining a printer) are used interchangeably herein. Computer 114, as referenced herein, is a general term for a computing device, which may include, but is not limited to, a laptop computer, a tablet, and the like. Artificial intelligence hub (not shown) may be an integral part of computer 114, or may be a separate electrical component 110, such as an Amazon Echo Dot® or Google Home®, or other form of machine intelligence (i.e., machine mimicking human cognitive function), mounted directly to the handlebar extension 108 and may interact with the store's software database(s) to send and receive order fulfillment information.

As shown in FIGS. 1 and 2, the electronic components 110, such as the computer 114, printer 116, artificial intelligence hub 130 (or part of 114), barcode reader/scanner 118, and RFID reader/scanner may be conveniently located near, or mounted to, the handlebar 108, such as between the handlebar 108 and the large basket 106, on the shopping cart. Positioning the electronic components 110 near the handlebar 108, provides easy viewing of the screen of computer 114, and easy access to the printer 116, artificial intelligence hub 130, barcode reader/scanner 118, and RFID reader/scanner for a user/employee using the mobile battery powered workstation cart 100 in a store. In this embodiment, a user/employee can easily view the computer screen 114 while pushing the battery powered mobile workstation cart 100 through the store and placing the necessary items into the large basket 106 (or onto the lower shelf 104, in the case of some larger items) to complete order fulfillment. Portable barcode scanners, portable RFID scanners, portable printers, or PDAs can have a docking station on the cart so that the user can dock items to free up their hands while fulfilling orders. Barcode reader/scanner 118 can refer to a holder and/or scanner with or without a holder, can support standard barcode scanner models, and can include components and accessories to charge the same. RFID reader/scanners can refer to a holder and/or scanner with or without a holder, can support standard RFID scanner models, and can include components and accessories to charge the same.

As shown in FIG. 2, any of the battery powered workstation carts 100 described herein may also comprise a battery 200. Battery 200 (which may also be referred to as a power system, such as being AC powered with a cable) may comprise a lithium battery 200, which is rechargeable (so to cover a desired amount of time, such as at least one or two work shifts, for example) and/or swappable, and/or removable. Lithium batteries 200 of the present disclosure contain lithium, such as lithium-ion batteries, noting that a lithium-ion battery 200 may be the preferred lithium battery 200 for use with one or more carts 100 referenced herein. While the embodiments described herein utilize a lithium battery 200, other batteries may also be used herein within the scope of the present invention.

In this embodiment, shown in FIG. 2, the battery 200 is housed in a secure housing 120 located below the handlebar 108 and below the electronic components 110 and coupled to frame 102. It should also be understood that battery 200 may be housed in other locations depending upon the design/configuration of the cart 100. Battery 200 may be housed within a secure and lockable housing 120, to prevent theft and damage. The housing 120 may also be used for a swappable battery option. The lithium battery 200 may be operably coupled to the electronic components 110, such as computer 114 and printer 116, barcode reader/scanner 118, RFID reader/scanner, and an artificial intelligence hub 130, to provide power. Additionally, the lithium battery 200 may be large enough to provide battery power for at least one employee shift, or approximately 8 hours. However, in other embodiments, the lithium battery 200 will be large enough to power all of the electronic components 110 for multiple employee shifts. The lithium battery 200 can be recharged, such as by plugging it in to a wall outlet and/or by replacing the battery 200 with another fully charged battery 200. Employees can recharge and/or replace batteries 200 between shifts and battery life is anticipated to be long enough to last for multiple employee shifts to maximize employee order fulfillment efficiency.

Additionally, any of the battery powered workstation carts 100 described herein may also include an artificial intelligence hub or device (such as Amazon Echo Dot®, or Google Home®) or another intelligent computerized machine. In some embodiments, the artificial intelligence hub may be mounted directly to handlebar 108 or may be an integral part of computer 114 (such as software or another program). Equipping a battery powered workstation cart 100 with an artificial intelligence hub will allow the store to have an artificial intelligence powered hub at the point of fulfillment to assist the employees in performing their jobs faster and more efficiently and will establish the foundation for future artificial intelligence software within stores. The artificial intelligence hub can interact with the store's software/database(s) so that store employees can use a hands-free device to send and receive information, such as order fulfillment information.

Additionally, any of the mobile battery powered workstation carts 100 described herein may also include Wi-Fi and/or Bluetooth Low Energy (BLE) and/or Global Positioning System (GPS) and/or a GPS locator therein (shown generally as electronic components 110 and/or as computer 114), which may be individually referred to as a communications component configured to operate using Wi-fi, BLE, and/or GPS technology. The Wi-Fi capability will allow the battery powered workstation cart 100 to connect to the local store's network. The BLE capability can communicate the cart's location within the store, while the GPS can transmit the cart's location outside of the store. The Wi-Fi capability will be important for integrating the battery powered workstation cart 100 with the store's existing technology and software. For example, the Wi-Fi may be used to provide the orders to the employee fulfilling the order. The Wi-Fi may also help to monitor order fulfillment progress and may also be used to map the fastest route for locating items or completing the order fulfillment tasks. The Wi-Fi, BLE, and GPS may also help to prevent theft of the battery powered workstation cart 100, as its exact position can be monitored/tracked. If lost, the battery powered workstation cart 100 can quickly be found using the Wi-Fi, BLE, and GPS.

The battery powered mobile workstation carts 100 herein may also comprise an anti-theft tag or device (shown generally as electronic components 110 and/or as computer 114). The anti-theft tag will set off any store security alarms if the mobile battery powered workstation cart 100 is removed from the store, unless needed to support order pick-up outside the store (e.g. parking lot or drive-thru service)

FIGS. 1, 3, 4, 5, and 6 illustrate various exemplary embodiments of the battery powered workstation cart 100, having several different swappable basket, bag, bin, crate, or tote configurations. FIG. 1 illustrates a mobile battery powered workstation cart 100 having a large basket 106 configuration, which can be removable, and can include various modular storage options, as may be desired. As shown in FIGS. 1, 3, 4, 5, and 6, the cart 100 may comprise two arms 140 and 142, which act as side bracket bars or support arms, and extend perpendicularly from frame 102. The two arms 140 or 142 (or side bracket arms 140 and 142) may also include notches or protrusions extending therefrom, sized to mate with a basket, bin, or crate, to securely hold the basket, bin, or crate within the two arms 140 and 142. The two side bracket arms 140 and 142 may remain attached to workstation cart 100 (i.e. permanently coupled to frame 102), even when large basket 106 is removed (such as shown in FIGS. 3-6), or may be removed from frame 102 to allow for even larger or bulkier items to be stored on lower wheeled shelf 104. The two side bracket arms 140 and 142 may be configured to receive different sized baskets, totes, crates, bags, etc. such as large basket 106 (shown in FIG. 1) or a smaller basket or bin 150 (shown in FIG. 4). These two side bracket arms 140 and 142 may be stationary or may also have vertically or horizontally adjustable heights, such that the basket or bin height and/or length can be adjusted. The two side bracket arms 140 and 142 may also have hooks for holding bags, totes, soft-goods, etc.

Figure 3:
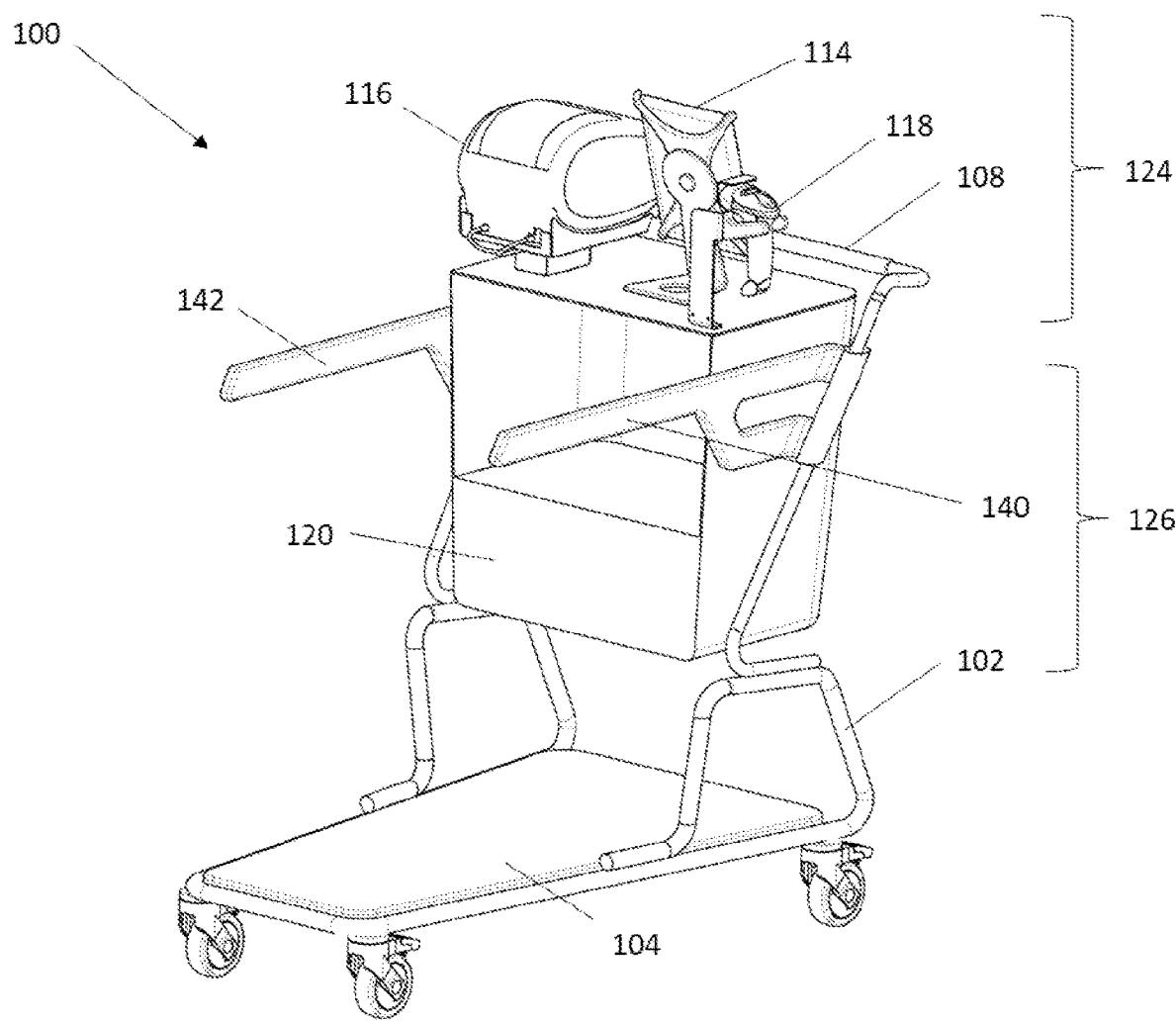
FIG. 3 illustrates a perspective view of an exemplary embodiment of a battery powered workstation cart, having an open configuration.
Figure 4:
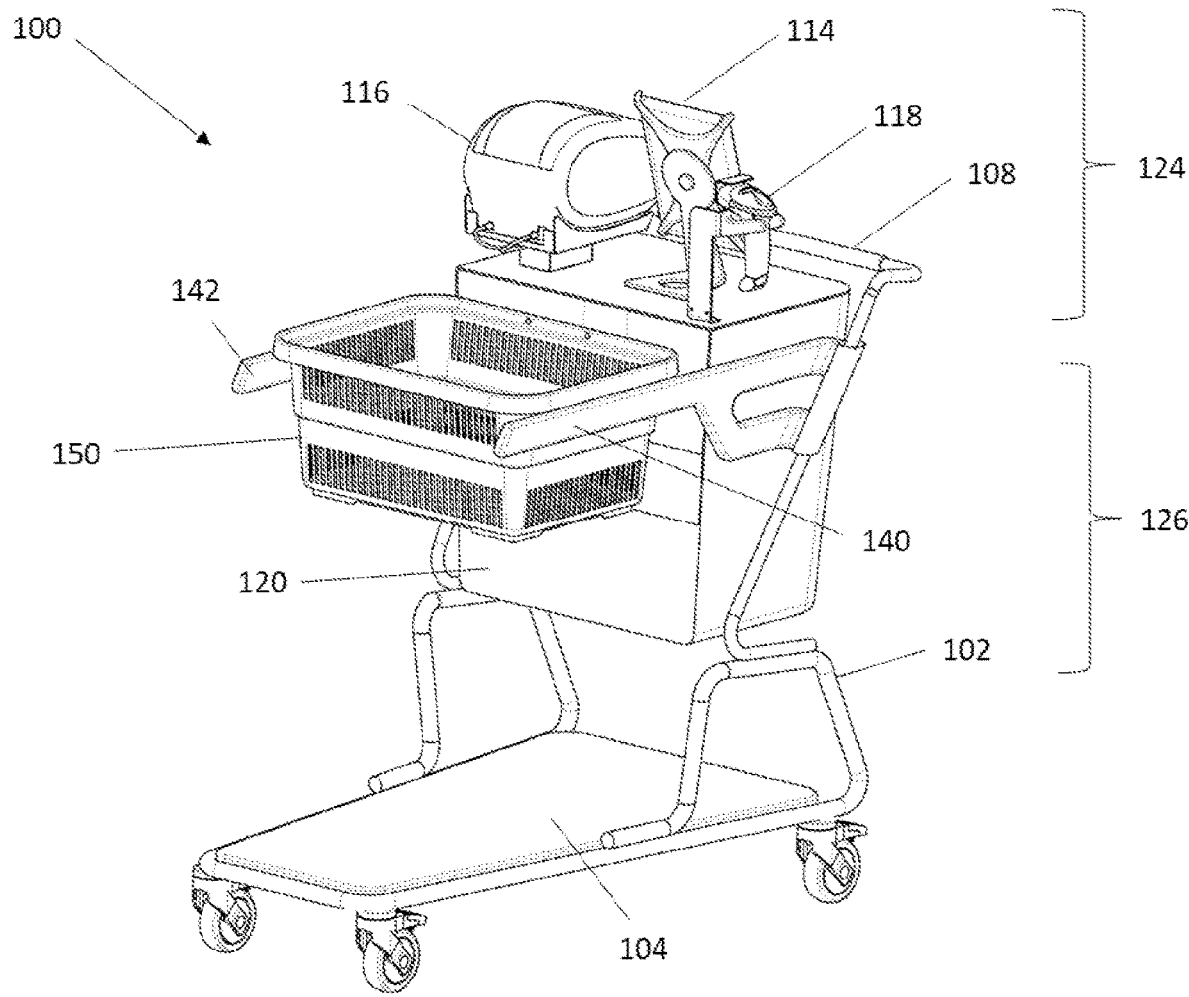
FIG. 4 illustrates a perspective view of an exemplary embodiment of a battery powered workstation cart, having a small bin therein.

As shown in FIG. 3, the large basket 106 may be removed from the two side bracket arms 140 and 142, such as by sliding or lifting, to entirely remove large basket 106 from the mobile battery powered workstation cart 100. In this embodiment, shown in FIG. 3, only the lower shelf 104 would be used in a flatbed configuration, such as for moving very large, tall, or bulky items. As shown in FIG. 4, the two side bracket arms 140 and 142 can also be sized to receive a smaller basket or bin 150. An employee may choose to use the smaller basket 150 for smaller order fulfillment (as shown in FIG. 4) and the larger basket 106 for larger order fulfillment (as shown in FIG. 1). This modular, or reconfigurable basket design, is desirable to customize the size and maneuverability of the battery powered workstation cart 100.

Figure 5:
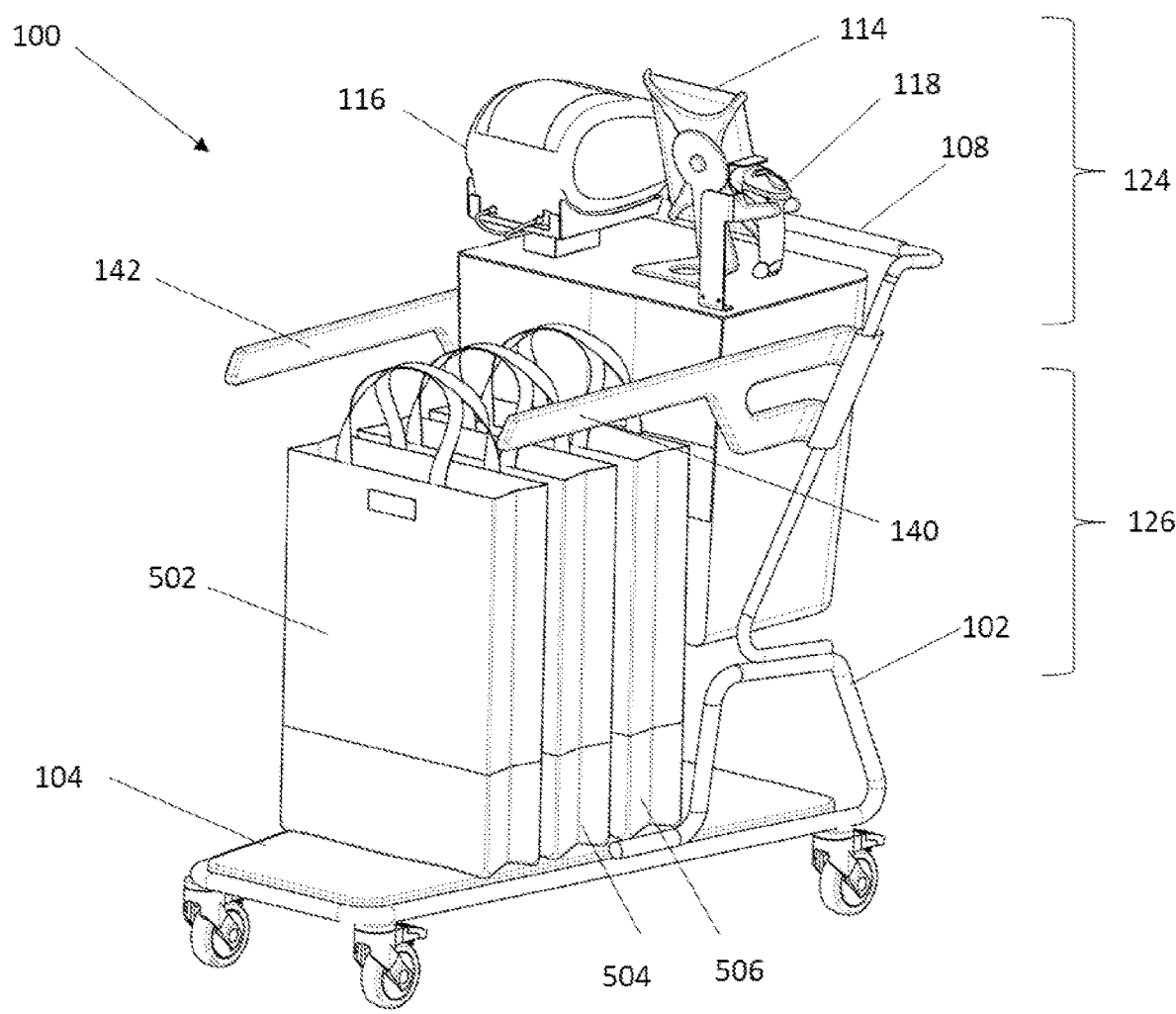
FIG. 5 illustrates a perspective view of an exemplary embodiment of a battery powered workstation cart, having three medium totes therein.
Figure 6:
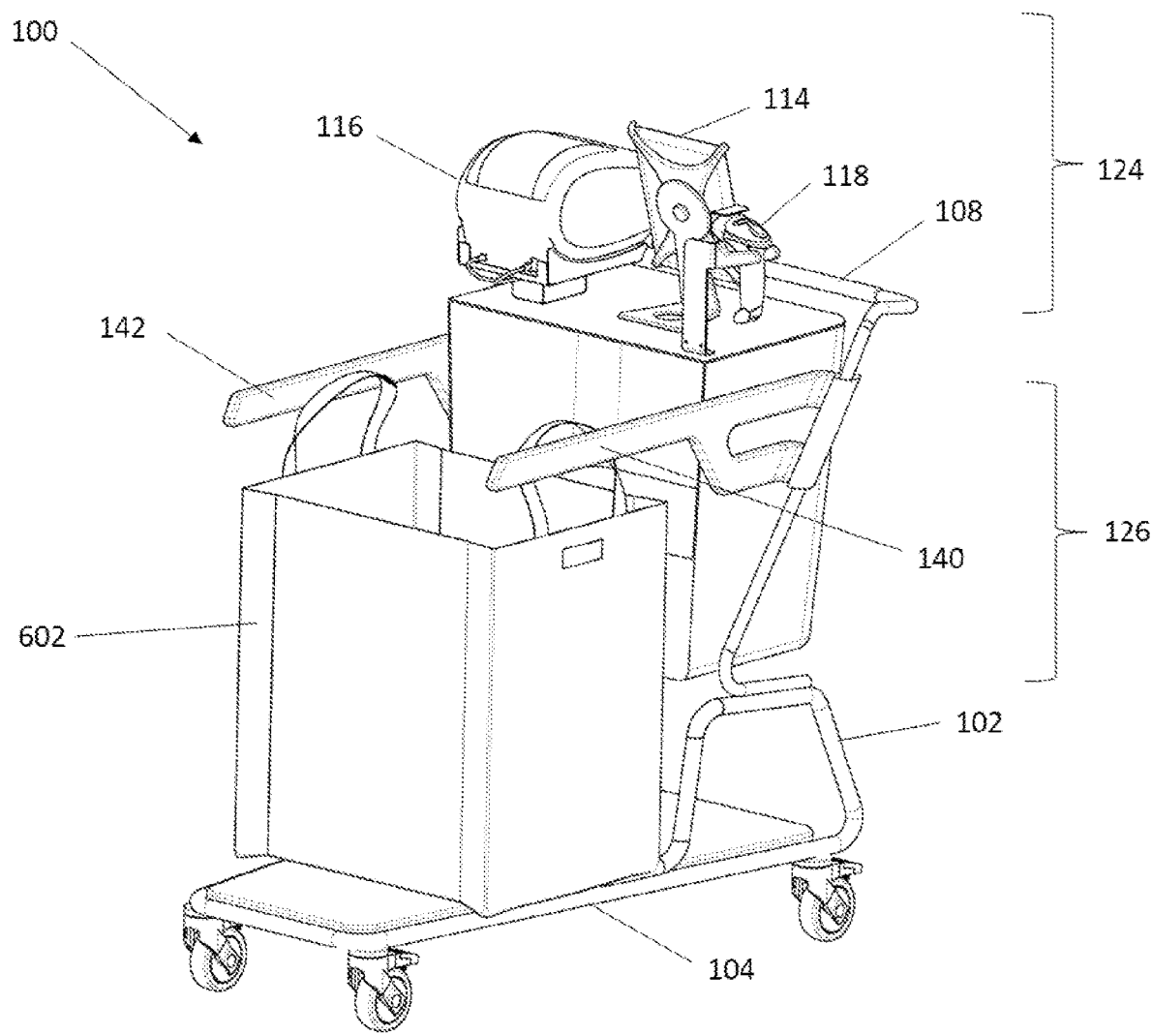
FIG. 6 illustrates a perspective view of an exemplary embodiment of a battery powered workstation cart, having one large tote therein.

FIGS. 5 and 6 illustrate exemplary embodiments of the battery powered workstation cart 100, having different bag, bin, or tote configurations. Because the battery powered workstation cart 100 is modular, and large basket 106 is removable, the cart 100 can then be configured to hold single, or multiple bags, bins, or totes (such as on lower shelf 104) in various swappable configurations. FIG. 5 illustrates an embodiment having multiple bags, bins, or totes 502, 504, 506 positioned on top of lower wheeled shelf 104 (when large basket 106 is removed). FIG. 6 illustrates an embodiment having a single bag, bin, or tote 602 positioned on top of lower wheeled shelf 104 (when large basket 106 is removed).

A store employee can pack the selected items directly into the bags, bins, or totes 502, 504, 506, and/or 602 (shown in FIGS. 5 and 6) as the items are selected from the store shelves. This prevents the redundant step of store employees having to return to a storage area to then bag the items selected, thus increasing store employee efficiency. It should be understood that the modular reconfigurable nature of the cart 100 means that many other configurations are also anticipated as being with the scope of the present invention. In one embodiment, for example, the bags, bins, or totes may be used within larger basket 106, or hung from or attached to bracket bars 140 and 142. In another exemplary embodiment, for example, standard plastic or paper shopping bags may be used, or they may be used in combination with the baskets, bags, bins, or totes. In some cases, a single basket, tote, bin, or bag might hold several smaller bags of items, for example. In other examples, the baskets, bags, bins, or totes may themselves be labeled and/or barcoded for easier location by store employees when the customer arrives to pick up the items.

FIG. 3 illustrates an embodiment of the mobile battery powered workstation cart 100 having a flatbed configuration. This larger flatbed configuration may be desirable in stores specializing in much larger and bulkier items, such as home building stores, for example. As shown in FIG. 3, the mobile battery powered workstation cart 100 may comprise a wheeled frame 102 having a handlebar 108 holding and a larger flat storage area 104, for accommodating larger or bulkier items. This mobile battery powered workstation cart 100 may also comprise electronic components 110 (such as computer 114, printer 116, barcode reader/scanner 118), operably coupled to a lithium battery 200, and securely mounted to frame 102 at a height convenient for a store employee. In other embodiments, the lower wheeled base portion may be larger (than that shown in FIG. 3) to provide additional room for larger and bulkier items.

Figure 7:
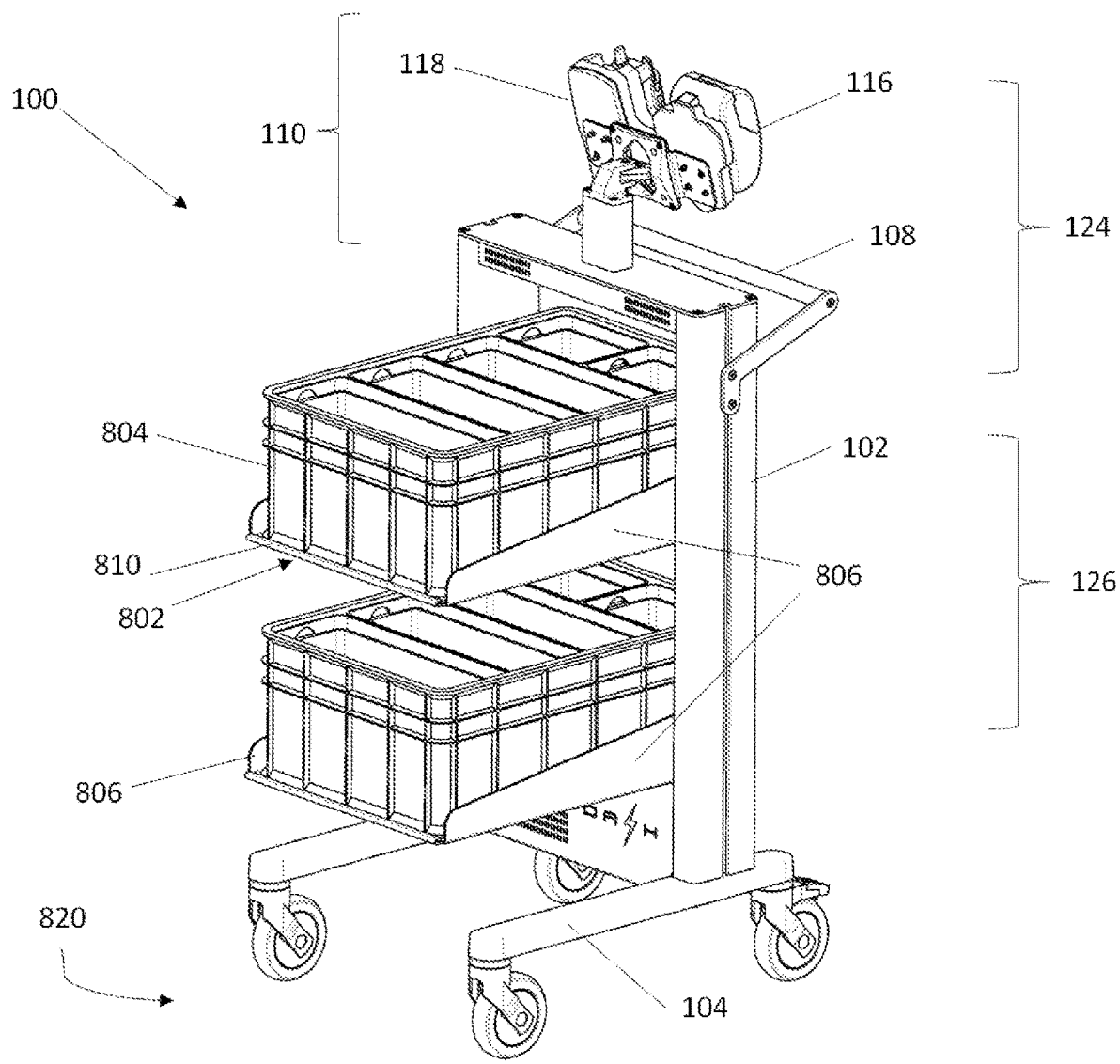
FIG. 7 illustrates a perspective view of an exemplary embodiment of a battery powered workstation cart, having two shelves.

As shown in FIG. 7, the battery powered mobile workstation cart 100 may be designed with shelves instead of two side bracket arms (as previously described above). In this embodiment, the frame 102 may include: 1) a lower wheeled base portion 104; 2) a middle portion (shown generally as 126) having at least one shelf 802 and configured to receive at least one bin 804 therein, wherein the shelf has higher brackets 806 along the sides and a lower front edge 810 to slidingly receive the at least one bin 804 via the lower front edge 810 of the shelf 802; and 3) an upper portion (shown generally as 124) having a handle 108 positioned at a comfortable standing height, and configured to securely receive a plurality of electronic components (generally referred to as 110) thereon.

An employee using the cart 100, shown in FIG. 7, can simply slide or lift the removable bin or bins 804 from the shelf 802, such as by sliding the bin 802 toward a front end of the cart (shown generally as 820) to remove the bin 804 from the cart 100. The higher side brackets 806 prevent the bin or bins 804 from sliding off the sides while the cart 100 is being moved or pushed. As shown in FIG. 7, the cart 100 may be configured with more than one shelf 802, such as two, three, or more shelves 802. The shelf 802, or shelves 802, may be stationary (i.e., rigidly fixed to frame 102) or may be vertically and/or horizontally adjustable (along frame 102), such as to make room for larger items between the shelves 802, or to increase shelf length, for example. Additionally, bin or bins 804 may be sized for receiving standard plastic or paper shopping bags, or they may be used in combination with the baskets, bags, bins, or totes. It should also be understood that the modular reconfigurable nature of the cart 100 and shelves 802 means that many other configurations are also anticipated as being with the scope of the present invention.

Figure 8:
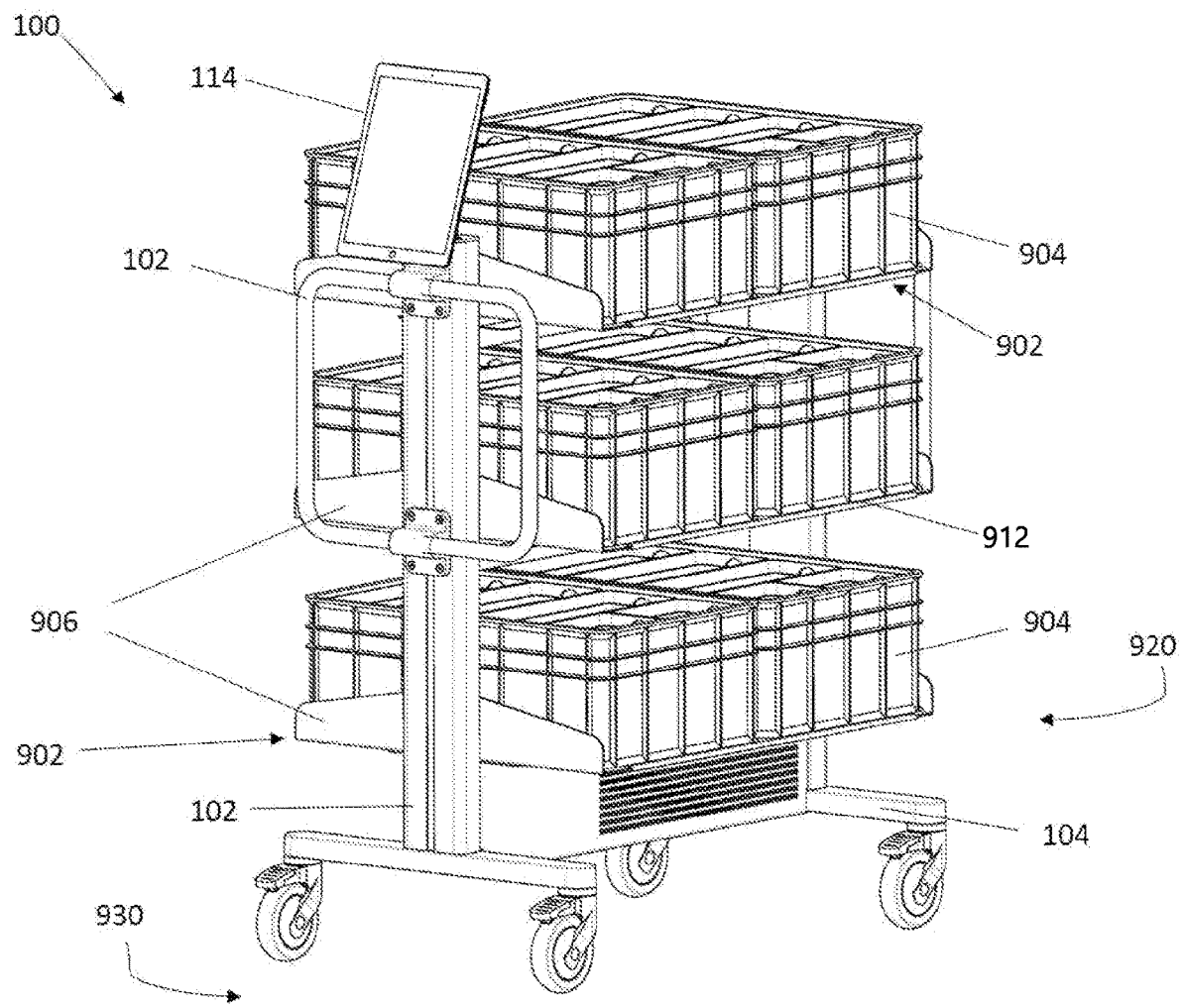
FIG. 8 illustrates a perspective view of an exemplary embodiment of a battery powered workstation cart, having three shelves.

FIG. 8 illustrates another embodiment of a battery powered mobile workstation cart 100 having shelves 902. In this embodiment, the frame 102 may include: 1) a lower wheeled base portion 104; 2) a middle portion (shown generally as 126) having at least one shelf 902 configured to receive at least one bin 904 therein, wherein the shelf 902 comprises higher end brackets 906 at both a front portion 920 and a back portion 930 of the cart, and wherein the shelf 902 also has a lower side edge 912 to slidingly receive the at least one bin 904 via the lower side edge 912 of the shelf.

As shown in FIG. 8, an employee using the cart 100, can simply slide or lift the removable bin or bins 904 from the shelf 902, such as by sliding the bin 902 toward a side of the cart 100 (i.e. toward the lower side edge 912) to remove the bin 804 from the cart 100. In this embodiment, the bin or bins 902 may be slid toward the sides of the cart 100 for removal from the cart (i.e., not toward the front portion 820 as shown in FIG. 8). The higher side brackets 906 prevent the bin or bins 904 from sliding off the front portion 920 or the back portion 930 of the cart while the cart 100 is being moved or pushed, which allows bin 902 access from the sides of the cart 100. As shown in FIG. 8, the cart 100 may be configured with more than one shelf 902, such as two, three, or more shelves 902, all containing multiple bins 904. The shelf 902, or shelves 902, may also be stationary (i.e., rigidly fixed to the frame 102) or vertically and/or horizontally adjustable (along frame 102), such as to make room for larger items between the shelves 902, or to increase shelf length, for example. Additionally, bin or bins 904 may be sized for receiving standard plastic or paper shopping bags, or they may be used in combination with the baskets, bags, bins, or totes. It should also be understood that the modular reconfigurable nature of the cart 100 and shelves 802 means that many other configurations are also anticipated as being with the scope of the present invention.

As shown in FIGS. 7 and 8, the carts 100 may operate as a mobile base workstation, for holding and powering electronic components 110, such as a computer 114 (such as a laptop computer or a tablet computer, with holder, for example), printer 116 (such as a label printer with holder, for example), artificial intelligence hub (may be part of computer 114, or electronic components 110), barcode scanner/reader 118, and RFID reader/scanner etc. needed for in-store order fulfillment.

Additionally, any of the above embodiments of the mobile battery powered workstation 100 may comprise an integral tray to provide additional worksurface area for a user. In this embodiment, a user may pull out a sliding tray, or flip up a handing tray, to access additional work surface area. A user may pull or slide the tray out to provide a flat writing or working surface and then the user can push the tray back in when the task is complete. The integral siding tray may be positioned at a convenient height for writing or typing while standing, such as near handlebar 108.

Additionally, any of the above embodiments of the battery powered workstation cart 100 may also contain a storage compartment, such as a drawer, cabinet, shelf or bin. This storage compartment, or multiple storage compartments in some embodiments, will be convenient for storing extra labels, forms, bags, stickers, label rolls, stationary, and other items necessary for order fulfillment. In some embodiments, this storage compartment may also encompass the electronic components 110. In one example, the storage area may be located underneath the handlebar 108 and adjacent to the electronic components 110, so that it is easily accessed by the user/employee. In some embodiments, designing the storage compartment to encompass the electronic components 110 may be advantageous for feeding labels rolls etc. into printer 116. Additionally, the storage compartment may be lockable to prevent theft. However, it should be understood the storage area may be located in other positions on the mobile battery powered workstation 100. Having all of the necessary items in one place, on a mobile workstation cart 100, will greatly increase employee efficiency in order fulfillment processes.

In an alternative embodiment of the present invention, the mobile battery powered workstation cart 100 may also comprise a secure lockable housing attached directly thereto (not shown). This secure lockable housing may encompass the electronic components 110 (i.e., computer 114, printer 116, artificial intelligence hub, RFID reader/scanner) and, optionally, the rechargeable lithium battery 200. It may be desirable to secure the lithium battery 200 and electronic components 110, such as the computer 114 and printer 116, in the same housing since they are operably coupled together. Additionally, securing the electronic components 110 in the lockable housing prevents damage and theft. The secure lockable housing may be coupled to frame 102 at a convenient height for user operation while standing.

Having a mobile battery powered workstation 100 with modular storage baskets, bins, bags, or totes, a rechargeable battery 200, and all necessary electronic components 110 (including artificial intelligence hub or device) for order fulfillment, will greatly improve in-store order fulfillment efficiency. An employee will be able to complete all order fulfillment tasks while moving through the store. The employee will less frequently need to return to a static workstation/computer area to bag, print labels, print final invoices, etc. Having a mobile battery powered workstation 100 with the familiar shopping cart design will provide a familiar and comfortable look to customers shopping in the store while the battery powered workstation cart 100 is in use. It will also provide easy maneuverability within the stores, which are already designed for shopping carts. The familiarity and easy maneuverability will help to reduce employee training time and reduce liability from accidents or injury, especially compared to current bulky workstation solutions.

While various embodiments of devices and systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A mobile workstation cart for order fulfillment comprising:
 a frame comprising:
  a base, the base comprising a solid and continuous lower shelf and having four wheels mounted underneath for movement of the cart;
  a middle portion rising from a left rear and a right rear of the base to form an upper portion;
  wherein the upper portion comprises a handlebar at the rear of the cart and the upper portion is configured to receive a plurality of electronic components near the handlebar such that the plurality of electronics can be easily accessed by a user pushing the cart;
 a battery on the cart and powering the plurality of electronics;
 two adjustable arms extending from the left rear and the right rear of the middle portion toward the front of the cart to receive a bin or basket therein, wherein the two adjustable arms are configured to be adjustable by sliding vertically along the middle portion;

wherein the base, two adjustable arms and middle portion form an open, reconfigurable bagging area for larger or smaller orders having different numbers and sizes of bags, bins, totes, crates or baskets thereon.

2. The mobile workstation card of claim 1, wherein the plurality of electronics comprises a computer, a printer and a communications component.

3. The mobile workstation cart of claim 1, wherein the two adjustable arms are spaced apart such that the front of the reconfigurable bagging area is open to receive an order or to receive a bin or basket therein; and wherein two of the four wheels are positioned vertically below the middle portion of the frame, and the two adjustable arms are removable from the middle portion such when the two adjustable arms are removed, the cart forms a flatbed configuration having an open front.

4. The mobile workstation cart of claim 1, further comprising a basket removably attached to the two adjustable arms.

5. The mobile workstation card of claim 1, wherein the two adjustable arms are at least substantially parallel to a floor.

6. The mobile workstation card of claim 1, wherein the two adjustable arms are permanently attached to the frame.

7. The mobile workstation card of claim 1, wherein the two adjustable arms are removably attached to the frame.

8. A mobile workstation cart for order fulfillment, comprising:
    a frame comprising:
        a lower wheeled base portion;
        a middle portion rising from a left rear and a right rear of the base to form an upper portion;
        wherein the upper portion comprises a handlebar at the rear of the cart and the upper portion is configured to receive a plurality of electronic components near the handlebar such that the plurality of electronics can be easily accessed by a user pushing the cart;
    a battery on the cart and powering the plurality of electronics; and
at least one shelf attached to the middle portion, and wherein the shelf comprises higher left and right outer side brackets and a lower front edge to slidingly receive at least one bin via the lower front edge of the shelf, and wherein the at least one shelf is horizontally adjustable.

9. The mobile workstation cart of claim 8, wherein the at least one shelf is positioned between a section of the middle portion rising from the left rear of the base and a second section of the middle portion rising from the right rear of the base.

10. The mobile workstation cart of claim 8, further comprising a second shelf rigidly fixed to the frame.

11. The mobile workstation cart of claim 8, further comprising a second shelf positioned above the at least one shelf.

12. The mobile workstation cart of claim 11, wherein the at least one shelf is vertically adjustable along the frame.

13. The mobile workstation cart of claim 12, wherein the second shelf is rigidly fixed to the frame.

14. A mobile workstation cart for order fulfillment, comprising:
    a frame comprising:
        a lower wheeled base portion;
        a middle portion rising from both a front and a rear of the base to form an upper portion;
        wherein the upper portion comprises a handlebar at the rear of the cart and the upper portion is configured to receive a plurality of electronic components near the handlebar such that the plurality of electronics can be easily accessed by a user pushing the cart;
    a battery on the cart and powering the plurality of electronics; and
    at least one shelf comprising higher end brackets at both a front portion and a back portion of the shelf, and further comprising a lower side edge to slidingly receive a bin via the lower side edge of the shelf, wherein the at least one shelf is horizontally adjustable.

15. The mobile workstation cart of claim 14, wherein the at least one shelf is attached to the middle portion at the front portion and the back portion of the shelf.

16. The mobile workstation cart of claim 14, wherein the at least one shelf is vertically adjustable along the frame.

17. The mobile workstation cart of claim 14, further comprising a second shelf rigidly fixed to the frame.

18. The mobile workstation cart of claim 14, comprising a second shelf positioned above the at least one shelf.

19. The mobile workstation cart of claim 18, wherein the second shelf is rigidly fixed to the frame and the at least one shelf is vertically adjustable along the frame.

* * * * *